US006314933B1

United States Patent
Iijima et al.

(10) Patent No.: US 6,314,933 B1
(45) Date of Patent: Nov. 13, 2001

(54) PISTON FOR INTERNAL COMBUSTION ENGINES

(75) Inventors: Tadashi Iijima, Yuki; Yorihiko Inada, Oyama, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/489,148

(22) Filed: Jan. 21, 2000

(30) Foreign Application Priority Data

Jan. 27, 1999 (JP) .................................................. 11-018939

(51) Int. Cl.[7] .......................................................... F01P 1/04
(52) U.S. Cl. ......................................................... 123/193.6
(58) Field of Search ........................................... 123/193.6

(56) References Cited

U.S. PATENT DOCUMENTS

| Re. 34,139 | * | 12/1992 | Copper et al. | 123/193.6 |
| 4,577,595 | * | 3/1986 | Deutschmann et al. | 123/193.6 |
| 4,581,983 | * | 4/1986 | Moebus | 123/193.6 |
| 5,065,706 | * | 11/1991 | Zvonkovic | 123/193.6 |
| 5,653,204 | * | 8/1997 | Shaffer | 123/193.6 |
| 5,724,933 | * | 3/1998 | Silvonen et al. | 123/193.6 |
| 6,026,777 | * | 2/2000 | Kemnitz et al. | 123/193.6 |

* cited by examiner

Primary Examiner—Marguerite McMahon
(74) Attorney, Agent, or Firm—Varndell & Varndell, PLLC

(57) ABSTRACT

A piston for internal combustion engines, capable of being manufactured easily and improving the durability of a combustion chamber, moved reciprocatingly in a cylinder of an internal combustion engine, and provided in a top surface thereof with a combustion chamber formed by recessing the same top surface, and in an outer circumferential wall of the combustion chamber with a cooling cavity the inner diameter of a lower portion of an inner circumferential surface of which is set smaller than that of an upper portion thereof, wherein a cross-sectionally angular portion defined by an upper edge portion, at which the combustion chamber is opened in the interior of a cylinder, of an inner circumferential surface of the combustion chamber and a piston-top surface is chamfered greatly in conformity with the cross-sectional shape of the upper portion of the inner circumferential surface of the cooling cavity to such an extent that the thickness of an upper portion of an inner circumferential wall of the cooling cavity does not greatly vary.

6 Claims, 6 Drawing Sheets

PISTON FOR INTERNAL COMBUSTION ENGINES

BACKGROUND OF THE INVENTION

1. Field of the Invention

This invention relates to a piston for internal combustion engines, and more particularly to a piston for internal combustion engines which has a combustion chamber in a top surface thereof.

2. Description of the Related Art

A piston for internal combustion engines which has a combustion chamber in a top surface thereof, for example, a piston for diesel engines which has a re-entrant type combustion chamber (a combustion chamber having an opened portion of a diameter smaller than a maximum inner diameter of the combustion chamber, and a comparatively deep recess) in a top surface thereof is formed by providing an outer circumferential wall of the combustion chamber with a cooling cavity, into which a cooling oil is injected during an operation of the engine to cool a top portion, the temperature of which becomes high, of the piston, especially, a cross-sectionally angular portion (edge portion) defined by an upper edge of an inner circumferential surface at which the combustion chamber is opened in the interior of a cylinder of the combustion chamber and a piston-top surface, whereby an increase in the temperature of the combustion chamber is minimized.

Such a structure is effective when an engine output is at a normal level but, when the level of an engine output is increased high, a high thermal load is imparted to the piston, so that the temperature of the cross-sectionally angular portion (edge portion) excessively increases. This would cause inconveniences to occur which include cracks ascribed to a decrease in the high-temperature strength of the material of the piston, the thermal deformation thereof and a high thermal stress put thereon. Therefore, the durability of the combustion chamber decreases.

Under the circumstances, the applicant of the present invention proposed "PISTON COOLING STRUCTURE FOR DIESEL ENGINES" disclosed in Japanese Utility Model Laid-Open No. 10449/1995, with a view to reducing such inconveniences.

The invention disclosed in this publication is a piston cooling structure for diesel engines which is provided with a cooling cavity in an outer circumferential wall of a re-entrant type combustion chamber, the cooling cavity being provided with a cooling oil introduction port from which a cooling oil is injected thereinto, wherein an inner diameter of the portion of the cooling cavity which is on the side of a top portion of the piston is set smaller than that of the portion of the cooling cavity which is on the side of a lower portion of the piston.

Since the inner diameter of the portion of the cooling cavity which is on the side of the top surface of the piston is set smaller than that of the portion of the cooling cavity which is on the side of the lower portion of the piston, the cooling oil in the portion of the interior of the cooling cavity which is on the side of the top portion of the piston flows close to the aforementioned cross-sectionally angular portion (edge portion) as compared with the cooling oil in the corresponding portion of a cooling cavity of a piston of related techniques.

As a result, the efficiency of a cooling operation using a cooling oil can be improved, so that a piston having a thermal load resistance higher than that of a piston of related techniques could be obtained.

In the structure of a piston of related techniques, the inner diameter of the portion of the cooling cavity which is on the side of the top portion of the piston is set smaller than that of the portion of the cooling cavity which is on the side the lower portion of the piston, so that a cross-sectional area of the cooling cavity gradually increases from the lower side of the piston toward the top surface thereof. Therefore, it is hard to make this piston since it has so to speak a structure obtained by shaving off a circumferential wall thereof from the inner side of the cross-sectionally angular portion (edge portion) thereof.

The reasons why the wall of the piston is shaved off from the inner side of the cross-sectionally angular portion thereof are as follows. In the case of a re-entrant type combustion chamber, the air in a space (squished area) between a piston-top surface and an inner bottom surface of a cylinder is made to flow into a combustion chamber when a piston moves up, to cause a whirling current to occur in a deep recessed portion of the combustion chamber, whereby a fuel is atomized. Consequently, it is necessary that an edge of a cross- sectionally angular portion of the combustion chamber be left to as great an extent as possible as a part for generating a whirling current. Thus, in order to improve the combustion chamber cooling effect, it is necessary to form the combustion chamber by shaving off a wall thereof from the inner side of an edge section of the cross-sectionally angular portion thereof.

Moreover, even when the combustion chamber is formed in this manner by shaving off the wall thereof from the inner side of the edge section of the cross-sectionally angular portion thereof, the edge of the cross-sectionally angular portion still remains for the above-mentioned reason. Therefore, heat points readily occur on the edge, and a sufficiently much improvement of the durability of the piston cannot be expected. In addition, the difficulty in cooling the opposite portion of the combustion chamber, i.e. the lower portion thereof arises as a new problem.

SUMMARY OF THE INVENTION

The objects of the invention include providing a piston for internal combustion engines, capable of being manufactured easily, preventing the occurrence of heat points and improving the durability of a combustion chamber.

The piston for internal combustion engines according to the present invention is formed by providing the same with the following structure so as to achieve the objects thereof.

A first invention relates to a piston for internal combustion engines, moved reciprocatingly in a cylinder of an internal combustion engine, and provided in a top surface thereof with a combustion chamber formed by recessing the same top surface, and in an outer circumferential wall of the combustion chamber with a cooling cavity the inner diameter of a lower portion of an inner circumferential surface of which is set smaller than that of an upper portion thereof, wherein a cross-sectionally angular portion defined by an upper edge portion, at which the combustion chamber is opened in the interior of a cylinder, of an inner circumferential surface of the combustion chamber and a piston-top surface is chamfered greatly in conformity with the cross-sectional shape of the upper portion of the inner circumferential surface of the cooling cavity to such an extent that the thickness of an upper portion of an inner circumferential wall of the cooling cavity does not greatly vary.

The "in conformity with the cross-sectional shape of the upper portion of the inner circumferential surface of the cooling cavity to such an extent that the thickness of an upper portion of an inner circumferential wall of the cooling cavity does not greatly vary" referred to above means a range of 0.8 t to 1.2 t, wherein t represents the thickness of a partition wall between the combustion chamber and cooling cavity. Preferably, the range is 0.9 t to 1.1 t. Basically, a smaller range is recommendable. Because, when the thickness is smaller than 0.8 t, the mechanical strength of the piston reaches a limit level, and when the thickness is larger than 1.2 t, a cooling effect is low.

The combustion chamber may be of either a shallow bowl-like toroidal type having a comparatively shallow recess and an opening the diameter of which is equal to or greater than a maximum inner diameter of the combustion chamber, or a re-entrant type.

According to this invention, the cross-sectionally angular portion defined by the upper edge portion, at which the combustion chamber is opened in the cylinder, of the inner circumferential surface of the combustion chamber is chamfered greatly in conformity with the cross-sectional shape of the upper portion of the inner circumferential surface of the cooling cavity to such an extent that the thickness of the upper portion of the inner circumferential wall of the cooling cavity does not greatly vary. Namely, unlike a piston of the related art, the piston according to the present invention does not require to form the combustion chamber by shaving the wall thereof from the inner side of the cross-sectionally angular portion defined by the upper edge portion, at which the combustion chamber is opened in the interior of the cylinder, of the inner circumferential surface of the combustion chamber and the piston-top surface. Therefore, the combustion chamber can be formed easily.

Since the partition wall between the combustion chamber and cooling cavity is formed to a substantially equal thickness, heat points, in which the temperature rises excessively, rarely occur in some regions of these parts. Accordingly, problems ascribed to the occurrence of heat points, i.e. inconveniences including the occurrence of cracks due to a decrease in the high temperature resistance of the material of the piston, the thermal deformation of the piston and the thermal stress put thereon can be prevented, and the durability of the combustion chamber can be improved.

When the cross-sectionally angular portion between the upper edge portion, at which the combustion chamber is opened in the interior of the cylinder, of the inner circumferential surface of the combustion chamber and the piston-top surface is chamfered in the case of a piston having a re-entrant type combustion chamber, the effect in generating a whirling current by introducing the air in the squished area into the combustion chamber decreases but this problem can be dealt with by carrying out a fuel injection operation under a high pressure.

When the high-pressure injection of a fuel (at, for example, 1500 Kg/cm$^2$ to 2500 Kg/cm$^2$, and at 2000 Kg/cm$^2$ to be exact) is carried out, the fuel is atomized, so that the mixing of the fuel with the air can be done satisfactorily even when a whirling current is not generated. Therefore, the edge section of the re-entrant portion is not strictly required.

A second invention relates to a piston for internal combustion engines according to the first invention, wherein the chamfered portion has a generally rounded shape.

According to this invention, an edge portion does not exist, and thermal stress concentration is minimized, so that stress imparted to a combustion chamber can be further reduced. Moreover, when an upper portion of an inner circumferential surface of a combustion chamber is rounded, a cross-sectional shape of an upper portion of an inner wall of the combustion chamber can be set similar to that of an inner circumferential surface of a cooling cavity, so that the thickness of the inner wall of the combustion chamber can be set more constant.

The third and fourth inventions relate to a piston for internal combustion engines according to the first or second invention, wherein the combustion chamber is of a shallow bowl-like toroidal type.

According to these inventions, the combustion chamber is of a shallow bowl-like toroidal type, so that a fuel injected from a fuel injection nozzle thereinto and flames occurring therein flow into a squished area; i.e., a cross-sectionally angular portion, which is defined by an upper edge portion at which the shallow bowl-like toroidal type combustion chamber is opened in a cylinder of an inner circumferential surface thereof and a piston-top surface, of the combustion chamber is chamfered, so that a fuel and flames which are to flow from the combustion chamber into the squished area are not obstructed thereby, this enabling a combustion efficiency, and furthermore the exhaust characteristics to be improved by effectively utilizing the air in the squished area.

Especially, when after-top-dead-center injection (ATDC), measures employed in a shallow bowl-like toroidal type combustion chamber so as to meet the recent exhaust regulations are taken, i.e., when the fuel is injected under a high pressure from a fuel injection nozzle into the combustion chamber so that the injection finishes in a position in which the piston moves down slightly from a top dead center, or, to be exact, at the time at which a crank angle of around 20 degrees is attained, the atomized and injected fuel and flames can expand smoothly over the chamfered portion into the squished area. Therefore, the air in the squished area can be utilized sufficiently. This enables the exhaust characteristics to be improved.

DESCRIPTION OF THE PREFERRED EMBODIMENT

A mode of embodiment of the invention will now be described with reference to the drawings.

Figure 1:
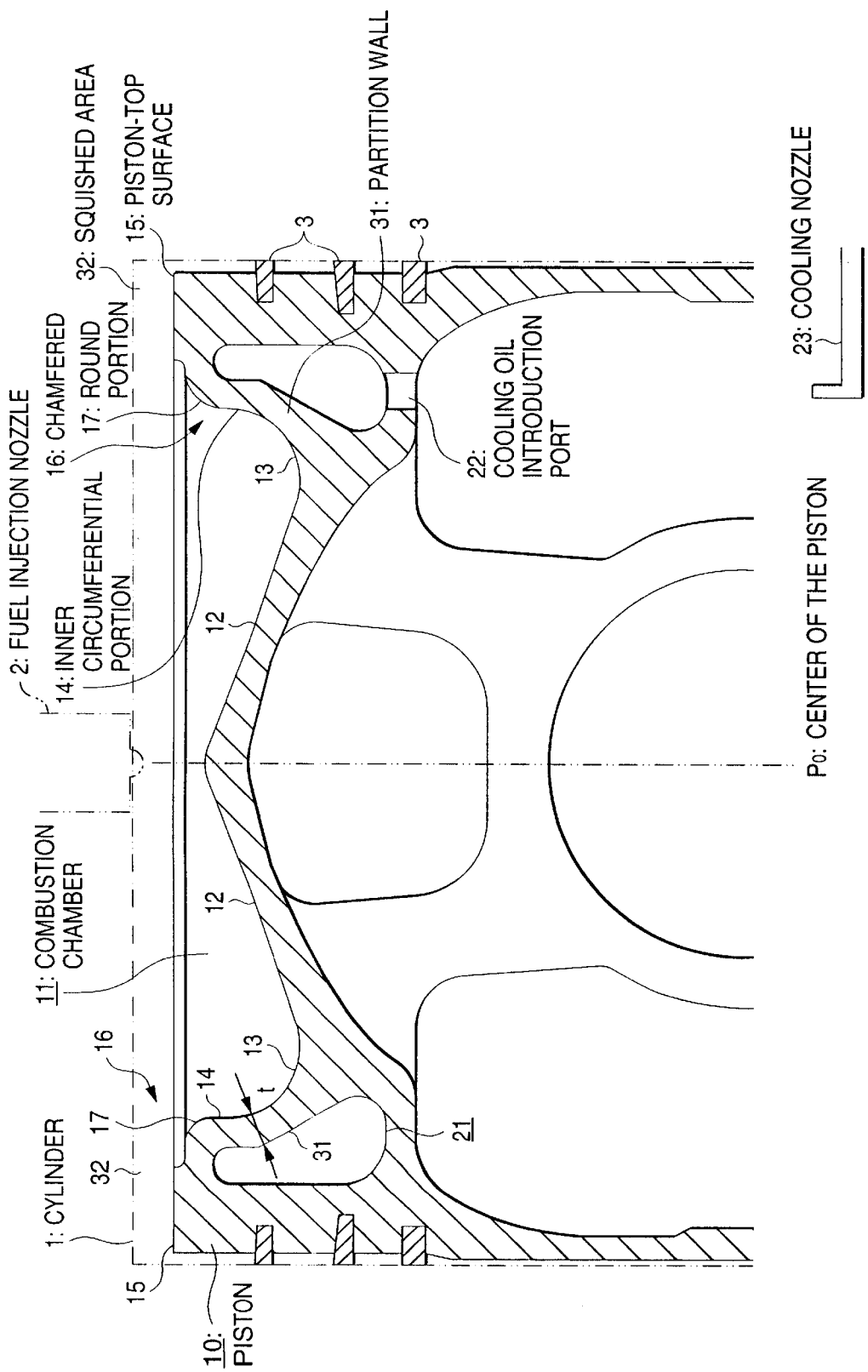
FIG. 1 is a sectional view showing a mode of embodiment of the piston according to the present invention.

FIG. 1 shows a piston for diesel engines to which the invention is applied. The piston 10 is adapted to be moved reciprocatingly in a cylinder 1 of an internal combustion engine, and formed cylindrically out of a material, such as spheroidal graphite cast iron, cast iron and aluminum alloy. A shallow bowl-like toroidal type combustion chamber 11 is formed in a top surface of the piston 10 by recessing the same surface, and a cooling cavity 21 which constitutes a flow passage for a cooling oil annularly in an outer circumferential wall (between the combustion chamber 11 and an outer circumferential surface of the piston 10) of the combustion chamber 11. Referring to FIG. 1, a reference numeral 2 denotes a fuel injection nozzle, and 3 piston rings.

A diameter of an outer circumference of the cooling cavity 21 is set substantially equal in the direction of the height thereof, and a diameter of a lower portion of an inner circumference thereof smaller than that of an upper portion thereof. Namely, the inner circumferential surface of the cooling cavity comprises an inclined surface formed so that it gradually gets close to the side of the center Po of the piston as the surface extends downward. Accordingly, a cross-sectional area of the cooling cavity 21 gradually increases from the side of the piston-top surface toward that of the lower portion of the piston.

Figure 2:
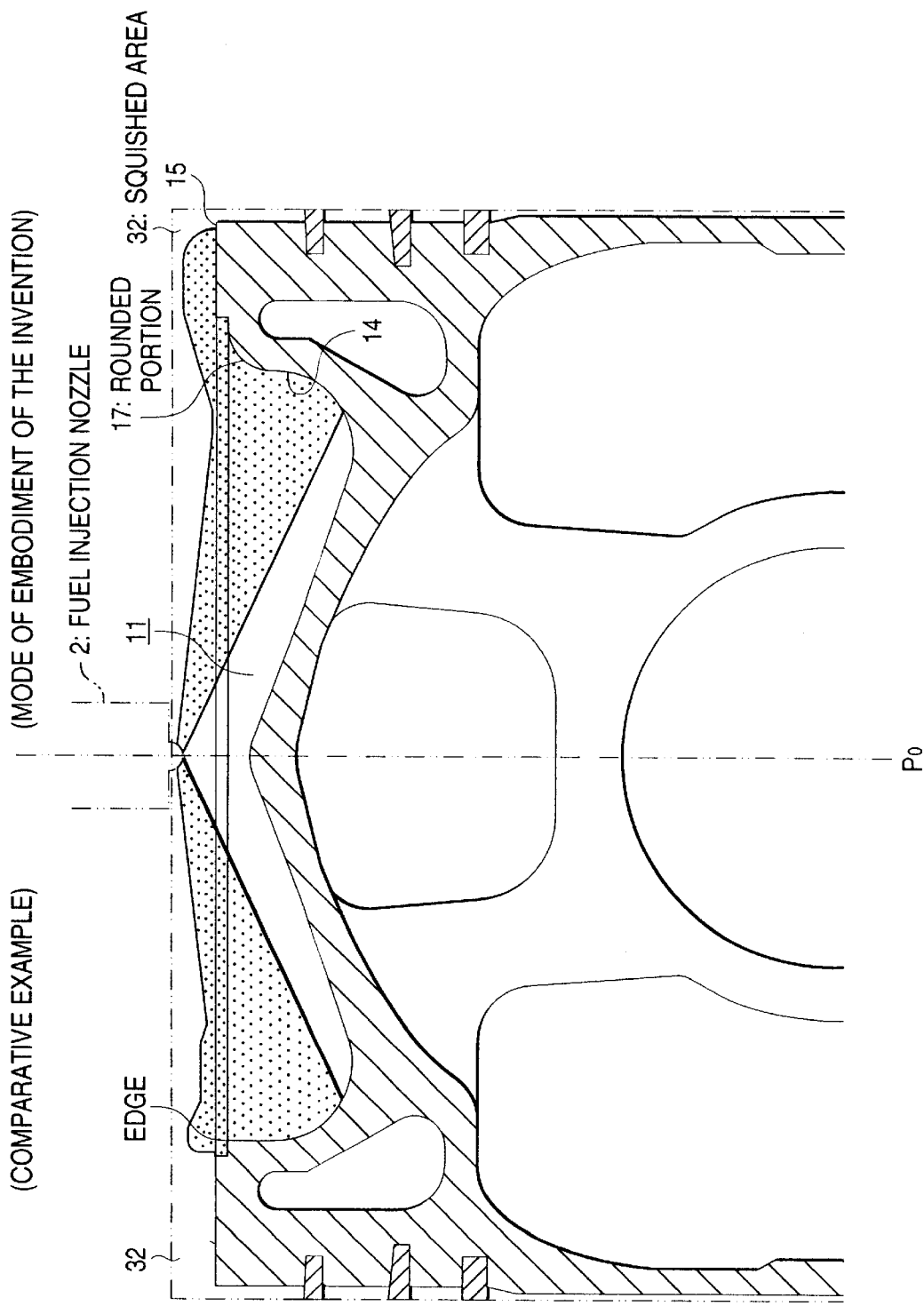
FIG. 2 is a drawing showing the condition of fuel injection in a case where a chamfered portion is provided and a case where a chamfered portion is not provided.

The cooling cavity 21 is provided with a cooling oil introduction port 22 at a lower portion thereof, and a cooling oil discharge port (not shown) at the portion thereof which is spaced from this introduction port at about 180°, in the same manner as in a piston of the related art (refer to, for example, FIG. 2 of Japanese Utility Model Laid-Open No. 10449/1995). A cooling nozzle 23 for injecting a cooling oil toward the cooling oil introduction port 22 is provided below this introduction port 22. Owing to this arrangement, the cooling oil injected from the cooling nozzle 23 flows from the cooling oil introduction port 22, passes through the cooling cavity 21 and cools the combustion chamber 11, and it then flows from the cooling oil discharge port, and is recovered by an additionally provided apparatus via the inner surface of the piston 1, the resultant cooling oil being sent to the cooling nozzle again.

The combustion chamber 11 is formed to a shallow bowl-like toroidal shape, and provided with a conical portion 12 inclined downward as it extends from the center Po of the piston 10 toward the outer circumference thereof, and an inner circumferential surface portion 14 extending from an outer circumference of the conical portion 12 so as to be opened in the interior of a cylinder 1 via an arcuate portion 13. Namely, a diameter of an opening of the combustion chamber 11 is set equal to or slightly larger than a maximum inner diameter (inner diameter of the arcuate portion 13) of the combustion chamber 11, and a depth (distance between a piston-top surface 15 and the arcuate portion 13) smaller than that of a re-entrant type combustion chamber.

An angular portion defined by the inner circumferential surface 14 and top surface 15 of the piston 10 is greatly chamfered 16 in conformity with the shape of the inner circumferential surface of an upper portion of the cooling cavity 21 to such an extent that the thickness of the wall of the combustion chamber does not greatly vary. Concretely speaking, the chamfered portion is formed to a comparatively large radius 17 so that the chamfered portion is substantially concentric with the inner circumference of the upper portion of the cooling cavity 21. Accordingly, the thickness t of a partition wall 31 between the combustion chamber 11 and cooling cavity 21 is substantially constant.

The operation of the piston 10 of the above-described construction will now be described.

The piston 10 is moved reciprocatingly in the cylinder 1. A fuel is injected under a high pressure (for example, 1500 Kg/cm$^2$ to 2500 Kg/cm$^2$, and 2000 Kg/cm$^2$ to be exact) from the fuel injection nozzle 2 toward the combustion chamber 11 so that the injection finishes in a position in which the piston moves down slightly from a top dead center, or at a crank angle of around 20 degrees to be exact.

Consequently, the atomized and injected fuel and flames flow from the combustion chamber 11 over the rounded portion 17, and into a space between the piston-top surface 15 and an inner bottom surface of the cylinder 1, i.e. a squished area 32, so that the air therein is utilized for the combustion of the fuel. Since the air in the squished area 32 can be effectively utilized, a utilization rate of the air becomes high, and this structure can contribute to the improvement of a combustion efficiency and furthermore the exhaust characteristics.

In order to cool the combustion chamber 11, a cooling oil is injected from the cooling nozzle 23 provided below the cooling oil introduction port 22. The injected cooling oil flows from the cooling oil introduction port 22, and passes through the cooling cavity 21 to cool the combustion chamber 11, i.e. the partition 31 formed between the combustion chamber 11 and cooling cavity 21. Since the thickness t of the partition wall 31 is set substantially constant, heat points rarely occur, and a decrease in the durability of the combustion chamber 11 can be prevented.

The cooling oil which has cooled the partition wall 31 flows from the cooling oil discharge port, and is recovered by an additionally provided apparatus via the inner surface of the piston 1. The cooling oil is cooled and adjusted in this apparatus, and sent to the cooling nozzle 23 again.

According to this mode of embodiment, the cross-sectionally angular portion defined by the upper edge portion of the inner circumferential surface 14 of the combustion chamber 11 and the top surface 15 of the piston 10 is greatly chamfered 16 in conformity with the shape of the inner circumference of the upper portion of the cooling cavity to such an extent that the thickness of the wall of the combustion chamber does not greatly vary. Therefore, unlike a piston of the related art, the piston of the embodiment does not require to form the combustion chamber 11 by shaving the wall thereof from the inner side of the cross-sectionally angular portion, at which the combustion chamber 11 is opened in the interior of the cylinder 1, of the inner circumferential surface of the combustion chamber 11 and the piston-top surface 15. Therefore, the combustion chamber 11 can be formed easily.

Since the thickness t of the partition wall 31 between the combustion chamber 11 and cooling cavity 21 is set substantially constant, heat points, in which the temperature rises excessively, rarely occur in some regions of these parts. Accordingly, inconveniences ascribed to an excessive increase in the temperature, i.e. the deformation of parts can be prevented, and the durability of the combustion chamber 11 can be improved. Especially, since the upper portion of the wall of the combustion chamber 11 is formed to a comparatively large diameter 17 so that the upper portion of the wall is substantially concentric with the inner circumference of the upper portion of the cooling cavity 21. Therefore, an edge portion does not exist, and the thermal stress concentration decreases, so that stress imparted to the combustion chamber 11 can be reduced.

Especially, in the shallow bowl-like toroidal type combustion chamber 11, the cross-sectionally angular portion thereof defined by the upper edge portion of the inner circumference at which the combustion chamber 11 is opened in the interior of the cylinder 1, and the piston-top surface 15 is chamfered 16, and an operation for injecting a fuel under a high pressure from the fuel injection nozzle 2 is designed so that the fuel injection finishes in a position in which the piston moves down slightly from a top dead center, or at a crank angle of around 20 degrees to be exact. Accordingly, the injected fuel and flames can expand smoothly from the rounded portion into the squished area 32, i.e., the air in the squished area 32 can be effectively utilized. This enables the combustion efficiency and exhaust characteristics to be improved.

The condition of an injected fuel in a case (comparative example) where a cross-sectionally angular portion defined by an upper edge section of an inner circumferential surface 14 and a top surface 15 of a piston 10 is formed of an edge, and that of an injected fuel in a case (this mode of embodiment) where such an angular portion is greatly rounded are shown in FIG. 2. Referring to FIG. 2, a left portion shows the comparative example, and a right portion this mode of embodiment.

As is understood from this drawing, the injected fuel in this mode of embodiment flows more smoothly into the squished area 32 between the piston-top surface 15 and the inner bottom surface of the cylinder 1 than that in the comparative example. In the comparative example, the fuel injected from the fuel injection nozzle 2 is obstructed by the edge of the combustion chamber 11, i.e., the edge prevents the fuel from flowing into the squished area 32, so that the air in the squished area 32 cannot be effectively utilized. Therefore, the combustion efficiency is low, and the improving of the exhaust characteristics cannot be expected.

Referring to FIGS. 1 and 2, a difference in level is shown between the rounded portion 17 and piston-top surface 15. Although this difference in level is not necessary in a regular piston, it is provided for engine designing reasons in a case where a head portion of a poppet valve interferes with the piston-top surface. This difference in level is illustrated in an exaggerated manner in the drawings but it is not larger than 1 mm in practice. The difference in level is provided not over the whole circumference of the piston but only in the portion thereof which interferes with the valve, and it is not of such dimensions that cause a special problem to arise.

Figure 3:
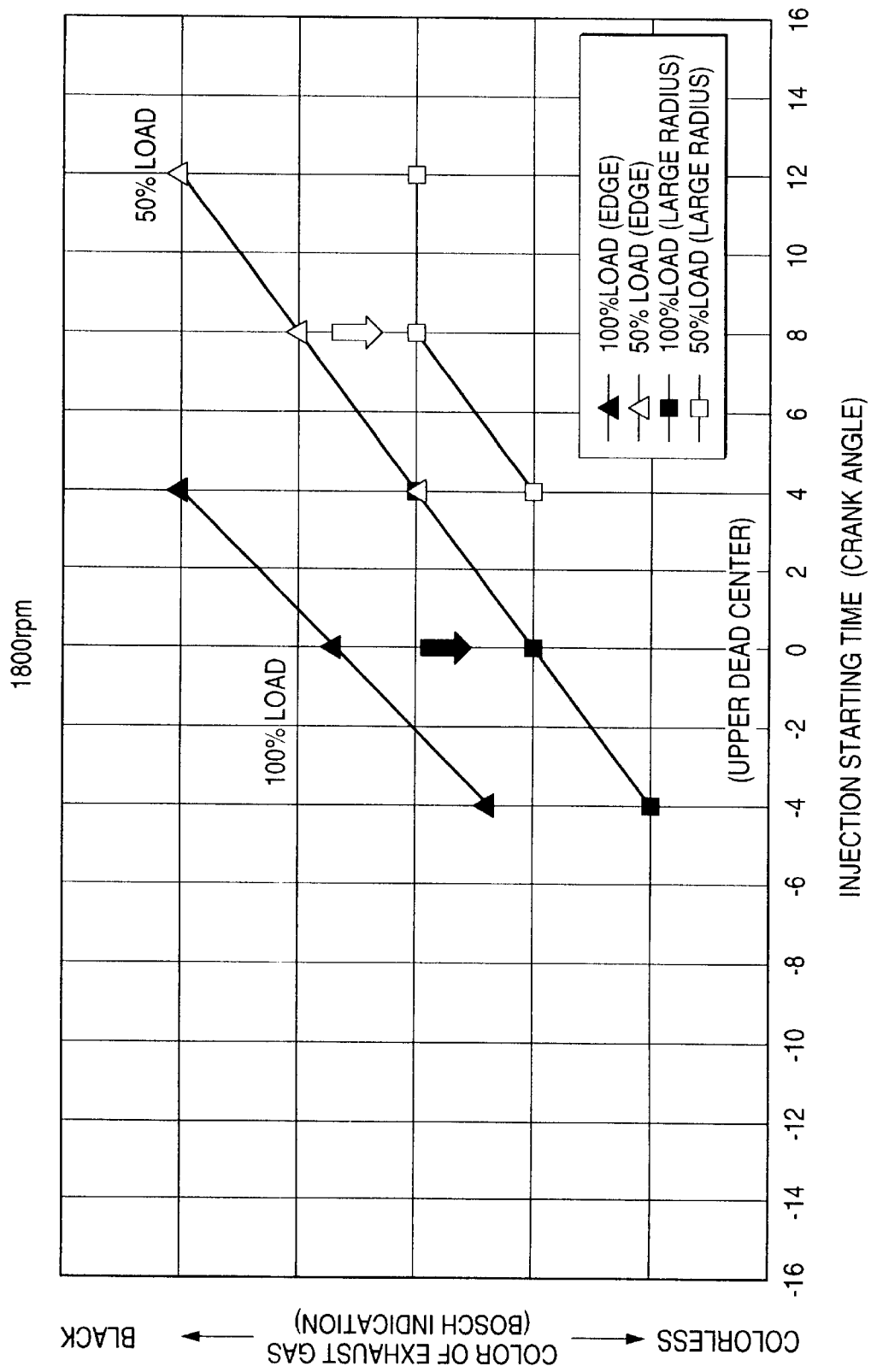
FIG. 3 is a diagram showing the exhaust performance (at the time of 1800 rpm) improving effects in a case where a chamfered portion is provided and in a case where a chamfered portion is not provided.
Figure 4:
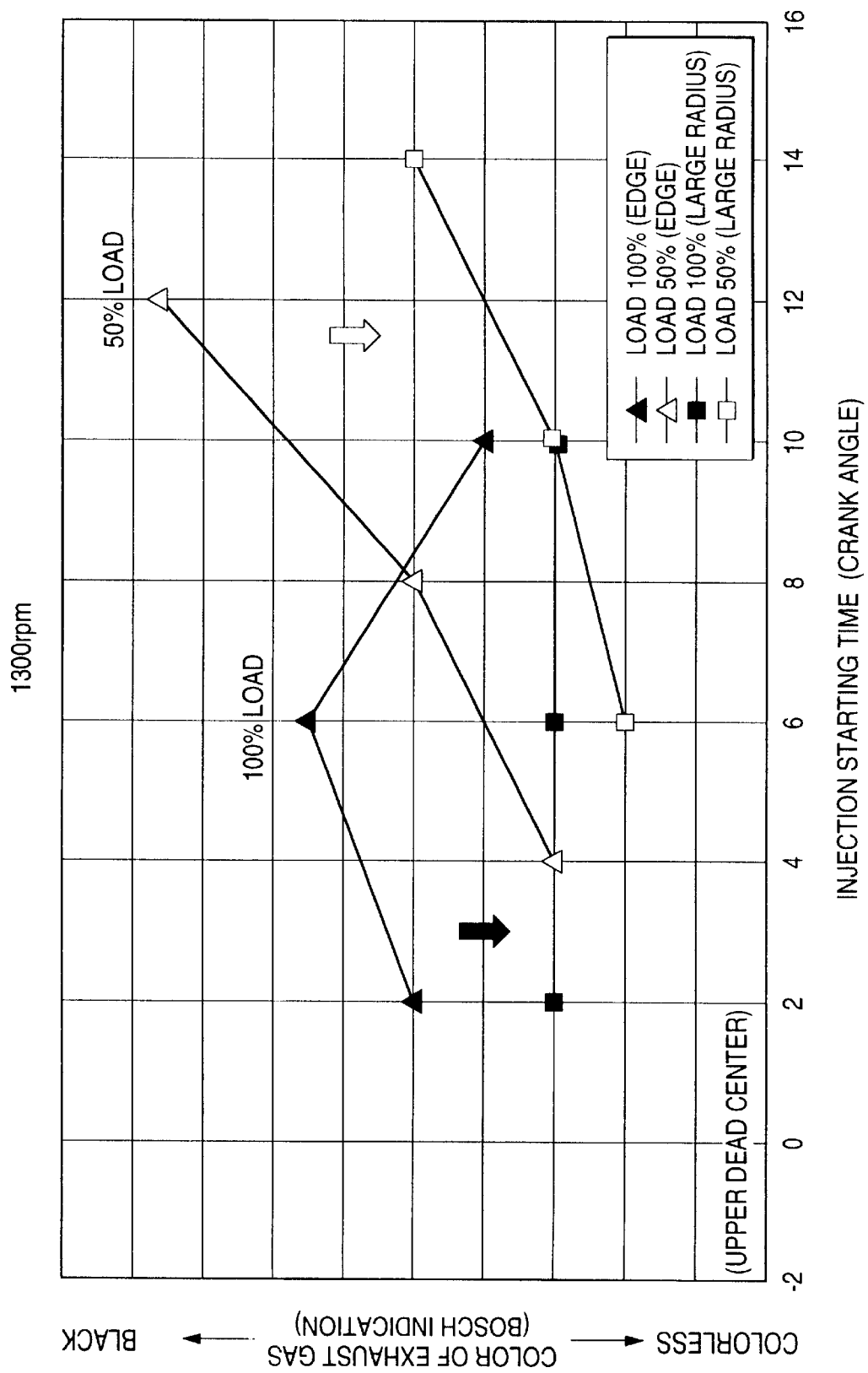
FIG. 4 is a diagram showing the exhaust performance (at the time of 1300 rpm) improving effects in a case where a chamfered portion is provided and in a case where a chamfered portion is not provided.

FIGS. 3 and 4 show the exhaust performance improving effect in a case where the cross-sectionally angular portion defined by the upper edge portion of the inner circumferential surface 14 of the combustion chamber 11 and the top surface 15 of the piston 10 and forming an edge (comparative example) is greatly rounded (this mode of embodiment).

FIG. 3 shows the exhaust performance of the comparative example (in which the cross-sectionally angular portion defined by the upper edge portion of the inner circumferential surface 14 and the top surface 15 of the piston 10 forms an edge) and this mode of embodiment in both of which a rotational frequency of the engine and a load imparted thereto are set to 1800 rpm and 100% respectively, and the exhaust performance of the comparative example and the same mode of embodiment in both of which a load is set to 50%. As is understood from this drawing, the exhaust gas in the mode of embodiment is turned colorless as compared with that in the comparative example.

FIG. 4 shows the exhaust performance of the comparative example and the mode of embodiment in both of which a rotational frequency of the engine and a load imparted thereto are set to 1300 rpm and 100% respectively, and that of the comparative example and the same mode of embodiment in both of which the load is set to 50%. As is understood from this drawing, the exhaust gas in the mode of embodiment is turned colorless as compared with that in the comparative example.

The present invention is not limited to the above-described embodiment, and the modifications and improvements made in the range which permits the objects of the invention to be achieved are included in the invention.

For example, the shape of the chamfered portion 16 formed on the cross-sectionally angular portion defined by the upper edge portion of the inner circumferential surface 14 of the combustion chamber 11 and the piston-top surface 15 may also be set as shown in FIGS. 5 to 8.

Figure 5:
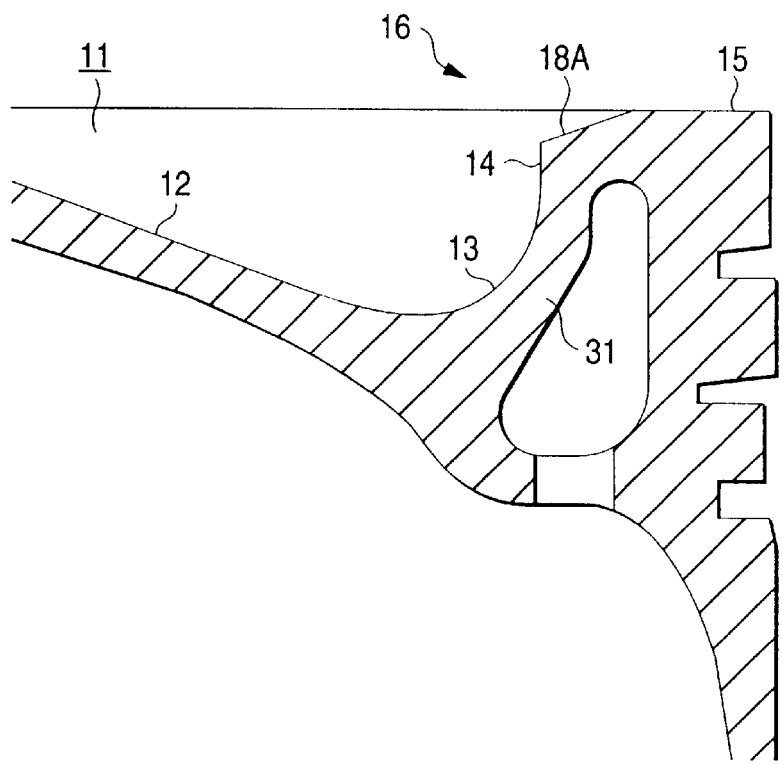
FIG. 5 is a drawing showing a chamfered portion of a combustion chamber, formed of a conical surface section.

A chamfered portion shown in FIG. 5 is provided with a conical surface portion 18A extending incliningly in the outward direction so that the height thereof increases gradually from a circumferential surface portion 14 toward a piston-top surface 15.

Figure 6:
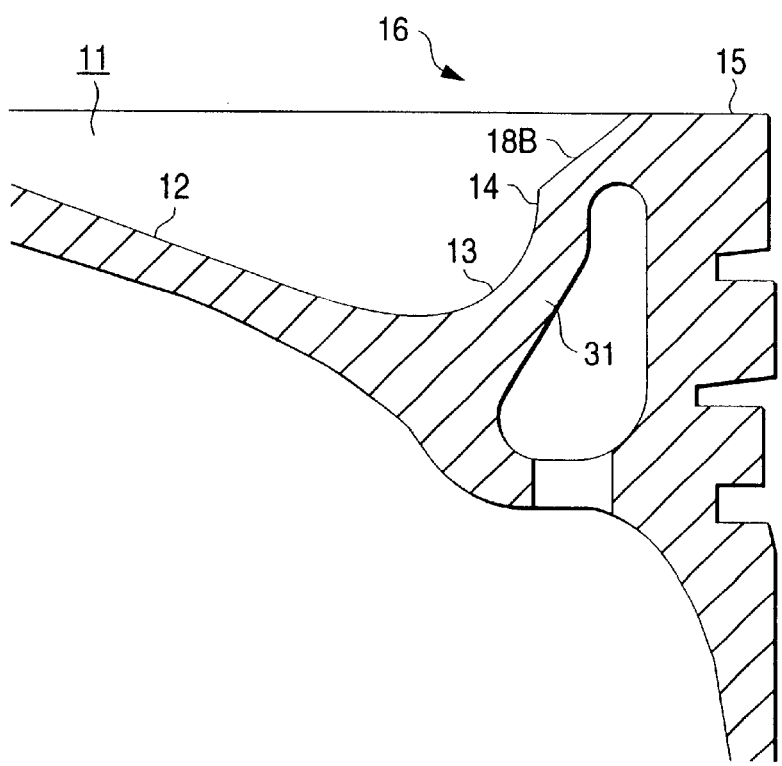
FIG. 6 is a drawing showing a chamfered portion of a combustion chamber, formed of a conical surface section the angle of which is different from that of the conical surface section of FIG. 5.

A chamfered portion shown in FIG. 6 is provided with a conical surface portion 18B extending incliningly in the outward direction so that the height thereof increases gradually from a circumferential surface portion 14 toward a piston-top surface 15, and having an angle different from that of the conical surface portion 18A of FIG. 5.

Figure 7:
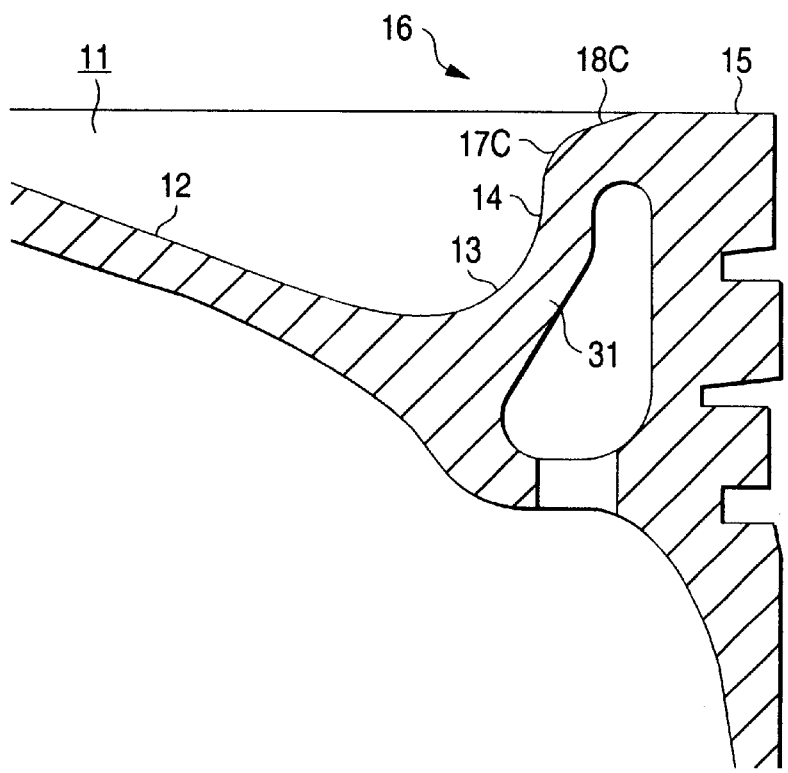
FIG. 7 is a drawing showing a chamfered portion of a combustion chamber, formed of a combination of a rounded section and a conical surface section.

A chamfered portion shown in FIG. 7 is identical with that shown in FIG. 6 in which an inner portion of an acute angle is rounded 17. Namely, the chamfered portion is provided with a rounded portion 17C curved gradually in the inward direction as this rounded portion extends from a circumferential surface portion 14 toward a piston-top surface 15, and a conical surface portion 18C formed on the outer side of the rounded portion and inclined so that the height thereof increases gradually as the conical surface portion extends outward toward the piston-top surface 15.

Figure 8:
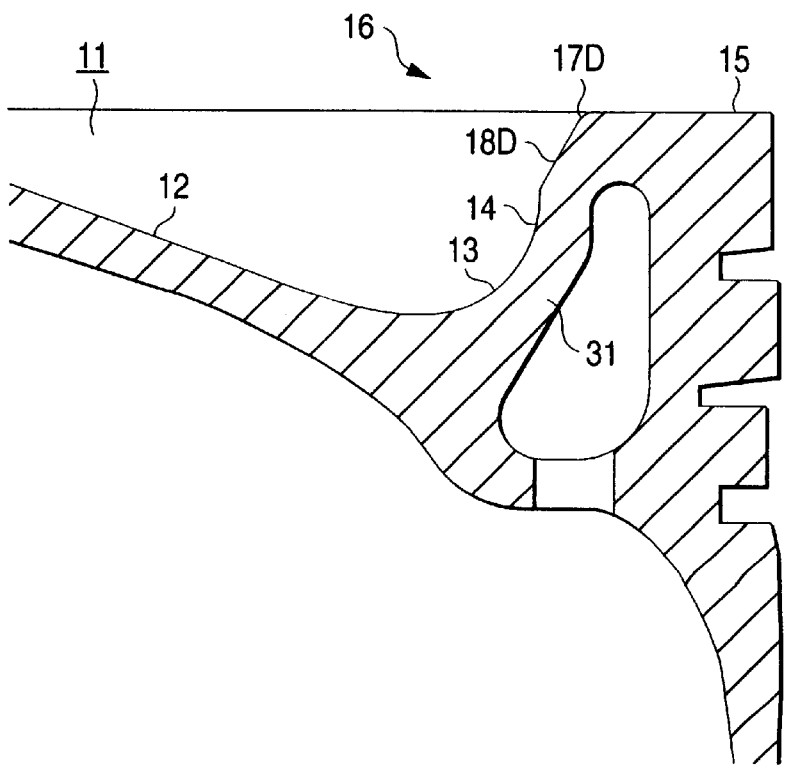
FIG. 8 is a drawing showing a chamfered portion of a combustion chamber, formed of a combination of a conical surface section and a rounded section.

A chamfered portion shown in FIG. 8 is provided with a conical surface portion 18D extending incliningly in the outward direction so that the height thereof increases gradually from a circumferential surface portion 14 toward a piston-top surface 15, and a rounded portion 17D formed on the outer side of the conical surface portion and bent gradually outward in an arcuately curved manner toward the piston-top surface 15.

As is understood from FIGS. 7 and 8, providing rounded portions 17C, 17D on the cross-sectionally angular portions of acuter anglels is effective in preventing heat points from occurring.

In the above-described mode of embodiment, the combustion chamber 11 is of a shallow bowl-like toroidal type, and the invention can also be applied to a re-entrant type combustion chamber. However, when the combustion chamber 11 is of a shallow bowl-like toroidal type, the fuel injected from the fuel injection nozzle 2 and flames flow smoothly from the rounded portion 17 into the squished area 32 as compared with those in the case of a piston having a re-entrant type combustion chamber, so that the exhaust characteristics improving effect is high.

When the cross-sectionally angular portion between the upper edge portion, at which the combustion chamber 11 is opened in the interior of the cylinder 1, of the inner circumferential surface 14 of the combustion chamber 11 and the piston-top surface 15 is chamfered 16 in the case of a piston having a re-entrant type combustion chamber 11, the effect in generating a whirling current by introducing the air in the squished area 32 into the combustion chamber 11 decreases but this problem can be dealt with by carrying out a fuel injection operation under a high pressure. Namely, when the high-pressure injection of a fuel (at, for example, 1500 Kg/cm$^2$ to 2500 Kg/cm$^2$, and at 2000 Kg/cm$^2$ to be exact) is carried out, the fuel is atomized, so that the mixing of the fuel with the air can be done satisfactorily even when a whirling current is not generated. Therefore, the edge section of the cross-sectionally angular portion of the combustion chamber is not strictly required.

The engine to which the present invention can be applied is not only a diesel engine but also a gasoline engine.

In the piston for internal combustion engines according to the invention, the cross-sectionally angular portion defined by the upper edge portion, at which the combustion chamber is opened in the interior of the cylinder, of the inner circumferential surface thereof is chamfered in conformity with the cross-sectional shape of the upper portion of the inner circumference of the cooling cavity to such an extent that the thickness of the wall of the combustion chamber does not greatly vary, so that the piston can be manufactured easily. Moreover, heat points at which the temperature excessively rises rarely occur in some of these parts. Therefore, problems ascribed to the occurrence of heat points can be prevented, and the durability of the combustion chamber can thereby be improved.

FIG. 1: 1 . . . CYLINDER, 2 . . . FUEL INJECTION NOZZLE, 10 . . . PISTON, 11 . . . COMBUSTION CHAMBER, 14 . . . INNER CIRCUMFERENTIAL PORTION, 15 . . . PISTON-TOP SURFACE 16 . . . CHAMFERED, 17 . . . ROUNDED PORTION, 22 . . . COOLING OIL INTRODUCTION PORT, 23 . . . COOLING NOZZLE, 31 . . . PARTITION WALL, 32 . . . SQUISHED AREA, P0 . . . CENTER OF THE PISTON.

FIG. 2: 2 . . . FUEL INJECTION NOZZLE, 17 . . . ROUNDED PORTION, 32 . . . SQUISHED AREA, A . . . (COMPARATIVE EXAMPLE), B . . . (MODE OF EMBODIMENT OF THE INVENTION), C . . . EDGE.

FIG. 3: A . . . BLACK, B . . . COLOR OF EXHAUST GAS (BOSCH INDICATION), C . . . COLORLESS, D . . . 100% LOAD, E . . . (UPPER DEAD CENTER), F . . . INJECTION STARTING TIME (CRANK ANGLE), G . . . 50% LOAD, H . . . 100% LOAD (EDGE), I . . . 50% LOAD (EDGE), J . . . 100% LOAD (LARGE RADIUS), K . . . 50% LOAD (LARGE RADIUS). FIG. 4: Same as the translation of the words shown in FIG. 3.

What is claimed is:

1. A piston for internal combustion engines that moves in a reciprocating manner in a cylinder of an internal combustion engine, the piston having a top surface, an outer circumferential wall, a combustion chamber formed by a recess in the top surface, and a cooling cavity arranged below the combustion chamber and adjacent the outer circumferential wall, the cooling cavity having a lower portion with a width larger than a width of an upper portion thereof, the combustion chamber having a structure of a cavity extending downward from a top of the piston about a center of the piston, an inner circumferential surface of the combustion chamber having a shape corresponding to a shape of the upper portion of the cooling cavity, so that a wall formed between the combustion chamber and the upper portion of the cooling cavity has a substantially uniform thickness t, wherein the thickness t is maintained within a range of a 0.8 t to 1.2 t.

2. A piston for internal combustion engines according to claim 1, wherein a portion of the inner circumferential surface of the combustion chamber is generally rounded.

3. A piston for internal combustion engines according to claim 1, wherein the combustion chamber is of a shallow bowl-like toroidal type.

4. A piston for internal combustion engines according to claim 2, wherein the combustion chamber is of a shallow bowl-like toroidal type.

5. A piston for internal combustion engines according to claim 1, wherein the thickness t is maintained within a range of a 0.9 t to 1.1 t.

6. A piston for internal combustion engines according to claim 2, wherein the thickness t is maintained within a range of a 0.9 t to 1.1 t.

* * * * *